UNITED STATES PATENT OFFICE.

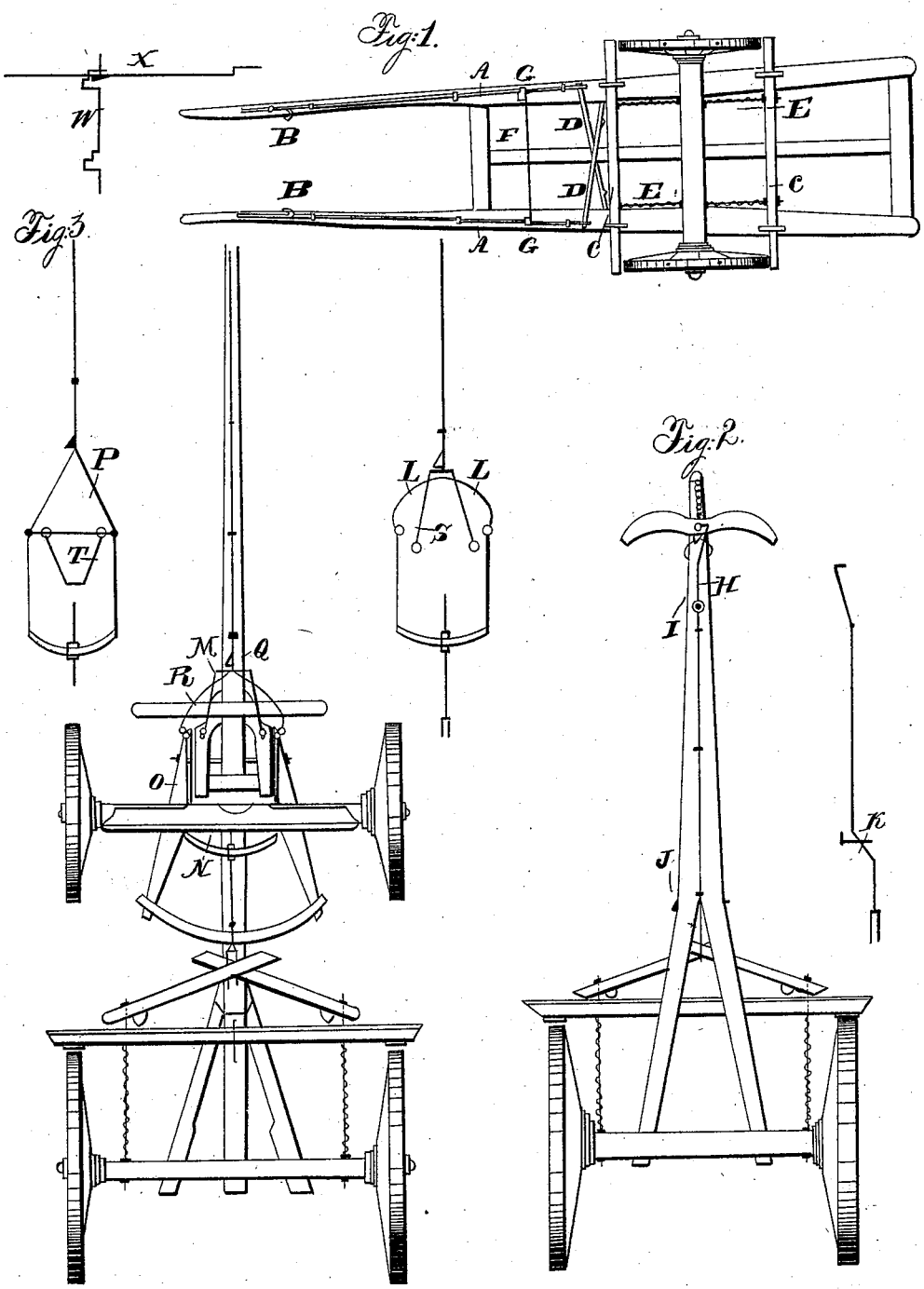

ELIJAH CHAPMAN, OF AKRON, OHIO.

CARRIAGE-BRAKE.

Specification of Letters Patent No. 4,775, dated September 26, 1846.

*To all whom it may concern:*

Be it known that I, ELIJAH CHAPMAN, of Akron, in the county of Summit and State of Ohio, have invented a new and improved plan, by which drays, carts and carriages, may be locked by the animal power required to propel them, which I call the self-operating lock; and I do hereby declare that the following is a full, clear, and exact description of the construction and operation of the same, reference being had to the annexed drawings, making a part of this specification, in which—

Figure 1, is a view of an inverted dray or cart.

In drays, carts, wagons or other carriages with shafts there is a rod, which I call a hold back rod (see drawing marked A, Fig. 1,) that passes along each shaft, to which they are connected by staples, so as to admit of their sliding backward and forward as the animal may hold back or otherwise. Near the fore end of the rods are hooks, marked B, Fig. 1, to which the breeching of the harness is attached, and in holding back the rods are moved so as to operate either directly on the brake or lock (marked C, Fig. 1) or on levers (marked D) the ends of which being connected with the lock rods (marked E, E,) bring the brakes directly against the forward and back part of the wheels, which are thus locked, and the object attained. The lock rods are fastened to the opposite ends of the levers from those which are directly operated on by the hold back rods, and run back through the forward brake, axletree, and hinder brake, when they are confined by a nut and turned on a screw, on the ends of the rods by which arrangement the brake may be brought nearer to or carried farther from the front and rear part of the wheels at pleasure.

A spiral or other spring is attached to the brake to prevent its pressing on the wheels, only when requisite to promote the object for which the lock it created. There is also a screw cut on the lock rods, on which a nut may be turned to tighten or stiffen the spiral spring when necessary. To back the cart, dray, &c., without locking the wheels, I use a stop (Fig. 1, Letter F,) which in carts or drays, is fastened on the underside of the shafts (extending quite across) so as to admit of its moving lengthwise, and which may be made either of wood or iron (see sectional drawing Fig. 1, Letter W.) The hold back rods pass through this stop, and have a shoulder on them directly in front of it, so large as to prevent their sliding back, when in contact with the smaller opening, by drawing the stop the width of the shoulder, the larger opening is presented, through, which the rods, with their shoulders easily pass, to operate on the levers (see sectional drawing of rod with shoulder Fig. 1, Letter X.) The stop is moved by taking hold of a handle on or near the end of it (marked G, Fig. 1.) If from any cause it shall be expedient to dispense with the brake on the hinder part of the wheels, the lock rods will then pass no further back than through the axletree, when they will be confined by nut and screw as before mentioned. The brake to ox carts is brought only against the forward part of the wheels, and is operated on by means of a single rod passing from the ox yoke, (to which it may be connected by means of a hook and staple or screw nut) along the tongue, until it comes in contact with the levers or brake (see Fig. 2, Letter H.) The stop is made by a hook or hook and chain attached to the end of the tongue and front side of the yoke, as may be required, or by a pin passing through a hole in the rod and through the tongue perpendicularly (see Fig. 2, Letter I,) or by a pin passing through the tongue horizontally, immediately back of the bend shoulder in the rod, which must be made in order to bring it down through the tongue, to operate on the levers or brake, which are placed underneath the tongue (see Fig. 2 Letter J,) see also sectional drawing Letter K. The brake on four wheel carriages with a neap or tongue, is applied to the forward part of the hinder wheels, and is made by the holding back of the animals attached to the carriage, by means of a rod passing along the tongue until it comes near the evener or doubletree, where (on carriages with a tongue that falls down when locked from the neck yoke) it is made bowing, and into two parts of triangular shape (see Fig. 3 Letter M,) which run back and connect by a joint, with two straight rods passing on the hounds on each side of the king bolt, to the rear of the forward axletree (see Letters O, O) when the ends are again connected by a rod forming a section of a circle, which plays through a hole or slit in a straight rod (marked N, Fig. 3) running along the reach to operate on the levers. The continuous line of connected rods are confined by staples, to the parts of the carriage over which they pass, so as to admit of their sliding back and forth when necessary. The portion of the rods made bowing or arching, are thus constructed to prevent their resting on the hounds, on the falling of the tongue. For a sectional drawing of the several connected rods, detached from the principal drawing see Fig. 3 Letters L L. On a carriage with a stiff tongue, no bow or joint is necessary (see Fig. 3 Letter P.) To back the carriage a shoulder is made on the rod on the tongue Fig. 3, Letter Q, in rear of which a stop fastened to the tongue by a bolt or staples, so as to raise or fall at pleasure, is placed, which may be represented by a trap door, when it is down and the top lies against the shoulder, it prevents the operation of the hold back rods on the levers (see Fig. 3, Letter R,) (see also sectional drawing Fig. 3, Letter S.) When raised by means of a string in the hands of the driver and the top thrown back toward the carriage, the rod is again in a situation to be used to lock the carriage (see sectional drawing Fig. 3, Letter T,) which shows the stop, when thrown back, so as to allow a free action upon the levers.

What I claim to be my invention is—

The combination of the bars C, C, rods K, springs E, E, and the levers D, D, for the purpose of making pressure on opposite sides of the wheels whenever the brake is operated.

ELIJAH CHAPMAN.

Witnesses:
   EDENT BULCB,
   W. R. GARDNER.